Jan. 28, 1930.  E. A. NELSON  1,744,915
WHEEL
Filed March 26, 1928  3 Sheets-Sheet 1
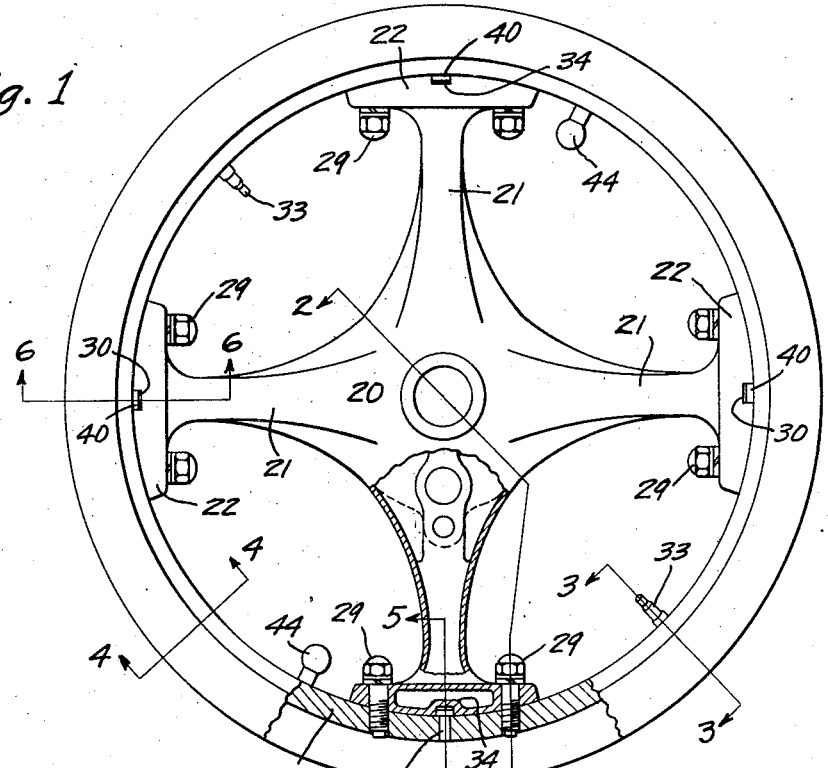
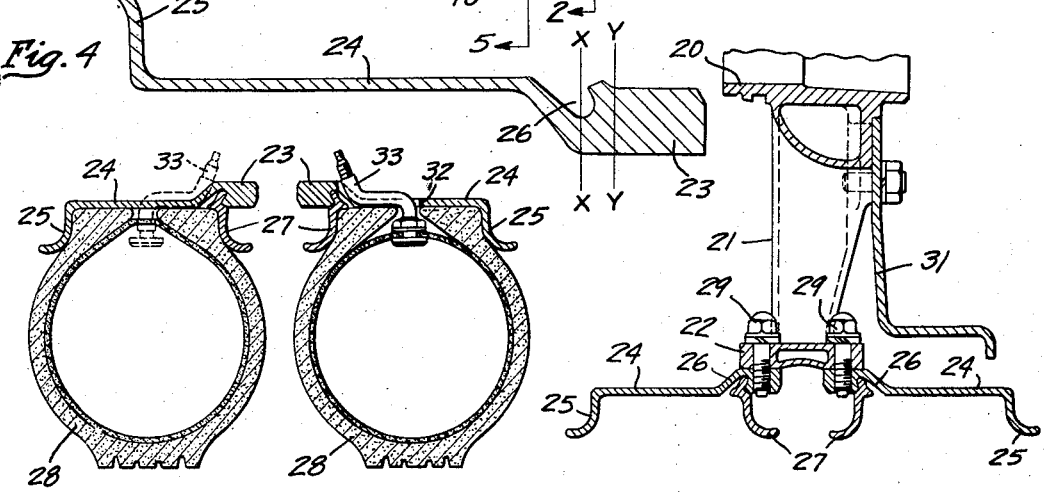
Inventor
EMIL A. NELSON
By Jhing Harness
Attorney

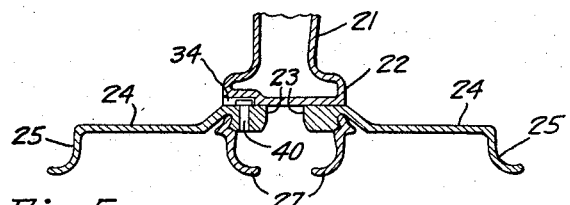
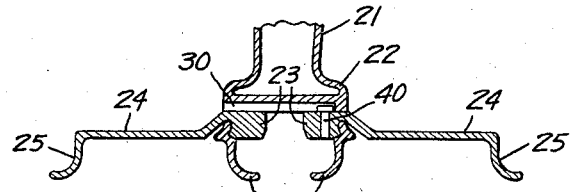
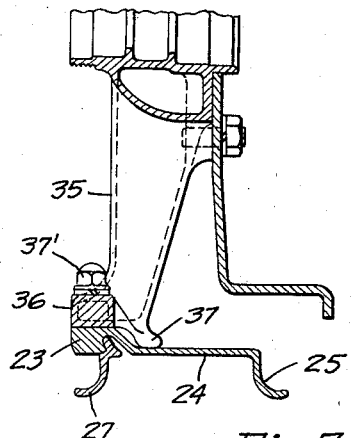
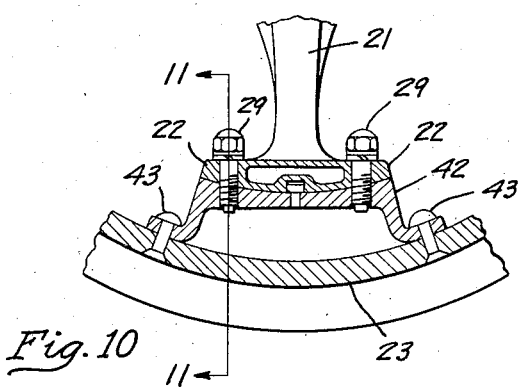
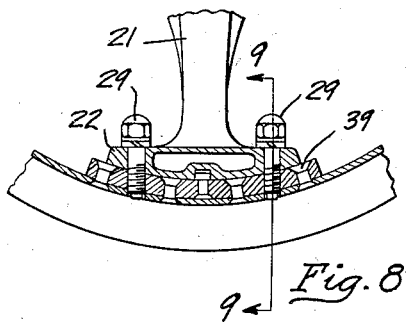
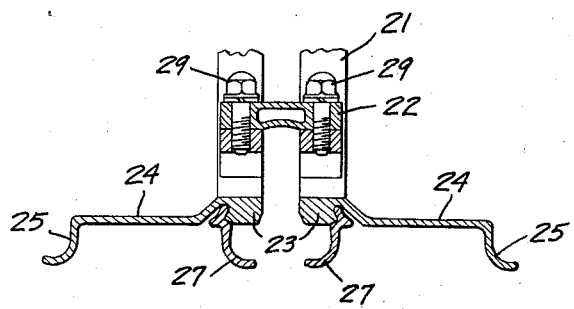
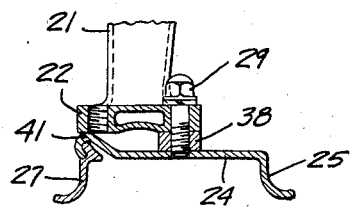

Jan. 28, 1930.　　　　　E. A. NELSON　　　　　1,744,915
WHEEL
Filed March 26, 1928　　　3 Sheets-Sheet 3

Inventor
EMIL A. NELSON
By
Attorney

Patented Jan. 28, 1930

1,744,915

UNITED STATES PATENT OFFICE

EMIL A. NELSON, OF DETROIT, MICHIGAN

WHEEL

Application filed March 26, 1928. Serial No. 264,745.

This invention relates to wheel and rim constructions for motor vehicles and the like, the principal object being to provide a new and novel form of wheel and rim construction that will be simple in design and economical to manufacture.

Another object is to provide a wheel and rim construction in which the rim may be chorded to facilitate its application to the wheel.

Another object is to provide a rim construction in which the rim is provided with a laterally off-set continuous ring portion providing a means for connecting the rim to its wheel.

Another object is to provide a wheel construction adapted to removably receive a rim thereon and comprising four or less radially extending arms terminating at their outer ends in non-connected seats, and provided with radially extending means for securing the rim thereto.

Another object is to provide a wheel construction to which various sizes of dual rims may be interchangeably secured.

Another object is to provide a wheel construction capable of carrying either single or dual rims.

Another object is to provide a quick and easy means for locating rims on a wheel.

A further object is to provide a simple means for forcing a rim on or from a wheel.

The above being among the objects of the present invention, the same consists in certain features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views,—

Fig. 1 is a partially broken side elevation of a rim and wheel construction showing the parts in assembled relationship.

Fig. 2 is a sectional view taken on the line 2—2 of Fig. 1.

Fig. 3 is a sectional view taken on the line 3—3 of Fig. 1.

Fig. 4 is an enlarged sectional view of one of the rim members only taken on the line 4—4 of Fig. 1.

Fig. 5 is a sectional view taken on the line 5—5 of Fig. 1.

Fig. 6 is a sectional view taken on the line 6—6 of Fig. 1.

Fig. 7 is a view similar to Fig. 2 but showing the application of a single rim to the wheel.

Fig. 8 is a fragmentary sectional view taken in the plane of the rim showing another method of securing a single rim to the wheel.

Fig. 9 is a sectional view taken on the line 9—9 of Fig. 7.

Fig. 10 is a fragmentary sectional view taken in the plane of the rim showing a preferable method employed for securing rims of a larger diameter than those previously shown to the wheel.

Fig. 11 is a sectional view taken on the line 11—11 of Fig. 10.

Figure 13:
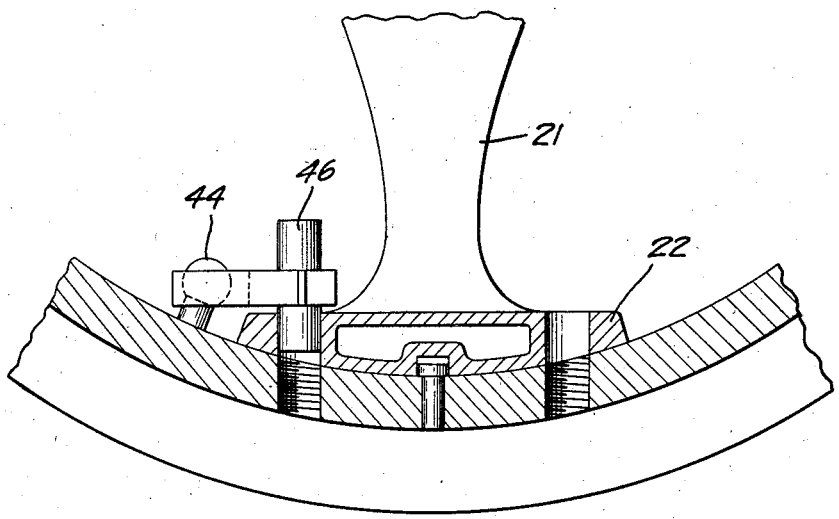
Fig. 13 is a fragmentary sectional view taken in the plane of the rim showing the application of the tool in Fig. 11 to the rim of the wheel.

The provision of a wheel for removably receiving dual rims presents many difficulties and heretofore the constructions provided have been more or less complicated and could only be produced at a relatively great cost. Furthermore, few constructions, if any constructions, have been provided where a single wheel could interchangeably receive various widths of rims and none so far as I am aware of, have been such as to be capable of interchangeably receiving various diameters of rims. With the above limitations of conventional constructions in mind and with a view to a simple and economical construction, I have devised the present invention in which these limitations have been overcome.

In such constructions, particularly when the wheel is of cast steel such as is conventionally employed, particularly for use in connection with heavier vehicles, the cost per pound for the wheel itself usually runs from three to four times the cost of the rim which is to be mounted thereon. By the present invention, I remove a relatively large portion of the material which is conventionally formed as an integral part of the wheel and instead, form it as an integral part of the rim, with the result that the decreased cost in producing the wheel is much greater than the increased cost in producing the rim and this results in the material saving in the production of the combined rim and wheel. Furthermore, I so position the material that has been transferred to the rim that such material provides a means for securing the rim to the wheel, increases the usual weak spot in the rim necessary for reception of the tire valve, and permits the employment of rims of various widths without providing any additional means on the wheel for receiving the same. Another feature of the present invention is that the wheel is provided with no felloe and the ends of the spokes are formed to provide short rim receiving seats which are adapted to closely receive the inner surface of the rim, and I employ four or less spokes whereby not only is the weight of the resulting structure diminished but the rim may be chorded from spoke to spoke in applying it to the wheel, thereby facilitating such application.

As indicative of the invention, I show in the accompanying drawings a wheel comprising a hub portion 20 provided with four integral radially extending spokes 21, each terminating in flange-like seat portions 22 formed with a cylindrical outer surface and each disconnected from the other. The hub, spokes and seats are preferably of hollow cast construction, all integrally joined together and formed to provide maximum strength with minimum weight. The rim may be of any conventional construction, such as that shown in enlarged section of Fig. 4, with the exception that from a line such as is indicated as Y—Y in Fig. 4, where the conventional rim would terminate, the same is extended laterally thereof to provide a relatively heavy continuous ring portion 23 which represents at least part of the material which would ordinarily constitute the felloe in conventional wheel constructions. The particular rim shown with the exception of portion 23 is of that conventional construction having a base 24, an integral side flange 25 and a groove 26 in which the split ring-like flange 27 is removably received, the pressure of the tire when inflated between the flanges 25 and 27, locking the flange ring 27 against displacement. Referring to Fig. 4, the cross sectional area of the portion 23 to the right of the line Y—Y is approximately one-third of the area to the left of the line Y—Y, or represents an addition of approximately one-third of the total material in a conventional rim of this type. The area to the right of the line X—X which passes through the lowest point of the groove 26 also represents approximately one-third of the total area of the rim shown on both sides of the line X—X. This addition of material may vary more or less from the particular amount shown without materially affecting the present invention, but the proportions are preferably approximately as shown.

The inside diameter of the portion 23 is substantially equal to the outside diameter across diametrically opposite seats 22 so that the portion 23, when the rim is applied to the wheel, will have a relatively close fit with the seat 22. By providing four or less spokes 21 and having the adjacent seats 22 relatively widely separated, the rim may in being applied to the wheel, be chorded or flattened between the seats 22 by manual pressure a sufficient amount to permit the rim to be easily and quickly applied to the wheel, and this feature also permits ease in removing the rim from the wheel, as will be readily apparent. The increased material in the rim which is positioned in the relatively thick portion 23 gives added strength to the rim and aids in providing the strength formerly provided by the felloe.

The application of dual rims to the wheel is best shown in Fig. 2. As shown in that figure, the rims are applied to the wheel so that the portion 23 of each rim lies adjacent to the other but relatively widely spaced. The rims are secured to the wheel by bolts 29 which slidably extend through the ends of the seats 22 and are threaded into corresponding portions 23 of the rims from the inside. The bolts 29 may be positioned perfectly radially, if desired, but I prefer to place them in parallel relationship which has a tendency to draw the rim into more perfect contact with the seats. It will be apparent from an inspection of Fig. 2 that rims of greater or lesser width and of the same diameter may be positioned on the wheel when they are formed in the manner shown without the need of any alterations of design or location of the holes for bolts 29 in the seats 22 in any manner whatsoever, although the location of the bolt holes in the portion 23 of the rim with respect to the groove 26 may be varied as suits the needs of the particular width of rim which it is desired to use in order to provide the proper clearance between the tires. This feature makes the wheel particularly adaptable for interchangeably receiving various widths of rims. It will be apparent, of course, that the outer rim in any case, must be removed before the inner rim may be removed but inasmuch as the removal of the outer rim necessitates removal only of readily accessible bolts, such removal does not entail a great amount of labor.

In dual wheel constructions of the type shown, which commonly support brake drums such as the brake drum 31 shown in Fig. 2, the brake drums usually approach so near to the inner surface of the adjacent rim that an elongated opening such as 32 in Fig. 3 must be provided for reception of a material length of the valve stem 33 in order that the valve stem will clear the brake drum and may be applied and removed without interfering with the same. In conventional constructions this slot 32 is of such proportion as to materially weaken that portion of the rim inasmuch as it forms a relatively long slot in the same which must necessarily approach to within a short distance of the edge of the rim. This disadvantage is overcome in the present rim construction inasmuch as the rim at the point where it is normally weak in the conventional constructions, is reinforced in the present case by the portion 23, as indicated in Fig. 3.

In order to locate the rims on the seats 22 so that the bolts 29 will accurately line up with their respective openings, I provide coacting means on the rims and the wheel to insure the same. This means is particularly well shown in Figs. 5 and 6. As shown, two opposite seats 22 are each provided with a single groove 30 in its outer face, the groove 30 extending axially of the wheel from its outer face to a point adjacent its inner face, and the rim is provided with a pair of headed pins 40 in the portion 23 and the heads project inwardly of the inner surface thereof, the pins 40 being arranged in diametrically opposite position to match with the grooves 32. When the inner rim is to be applied to the wheel, the pins 40 are inserted into their respective grooves 30 and the rim is moved inwardly until the pin 40 contacts with the end of the groove 30 which limits its inward movement at a point where the openings for the bolts 29 in the seat 22 and in the rim are in matching relationship, both axially of the wheel and circumferentially thereof. The other two diametrically opposite seats 22 are each provided with a groove 34 which extends inwardly of the corresponding seat 22 a relatively short distance as shown in Fig. 5. The outer rim is provided with pins 40 identical with and placed the same as the pins 40 are placed with respect to the inner rim. In applying the outer rim to the wheel, its pins 40 are guided into the grooves 34 with the result that the outer rim is likewise accurately located on the wheel so that the openings for the bolts 29 are in line. Thus, either rim may be used as the inside or the outside rim and whichever it is used for, it is accurately located on the wheel for reception of the bolts 29.

The above described rim construction may be applied to a wheel particularly formed to receive a single rim such as is shown in Fig. 7. In that construction, the spokes 35 are provided with seats 36 similar to the seats 22 previously described, except that each seat is provided with an outwardly extending lug portion 37 which is adapted to bear against the base portion 24 of the rim when the portion 23 thereof is secured to the seat 36. The connection between the seat 36 and portion 23 may be made in the manner similar to the previously described construction by means of bolts 37'. However, I prefer because of economy to employ a construction such as is indicated in Figs. 8 and 9 in which the wheel construction remains identical to the construction first disclosed but instead, I employ a modified form of rim construction in which, instead of using the portion 23 as located in the previous views, I provide an inwardly extending seat portion 38 secured to the inner face of the rim by means of rivets 39 or other suitable means, at points corresponding to the spacing of the seats 22 on the wheel. The portions 38 are of a sufficient thickness and are so spaced that when the bolts 29 are threaded into the same, the inwardly extending portion 41 of the rim bears against the opposite side of the seat 22 and thereby serves as an additional support for the same. The rim in this case is thus centrally located with respect to the spokes.

Where it is desired to employ rims of different diameters in addition to rims of different widths on the wheel so as to be interchangeably received thereon, I prefer to secure inwardly extending pads, such as is shown at 42 in Figs. 10 and 11, to the portion 23 of the rim by means of rivets such as 43 or other suitable means, the pads 42 co-acting with the seats 22 and being secured to the seats 22 by bolts 29 in exactly the same manner as though no pads 42 were employed. Pads such as 42 may be easily and quickly applied to rims of larger diameters at very low cost and thereby permit the use of rims of various diameters on a single size of wheel.

Figure 12:
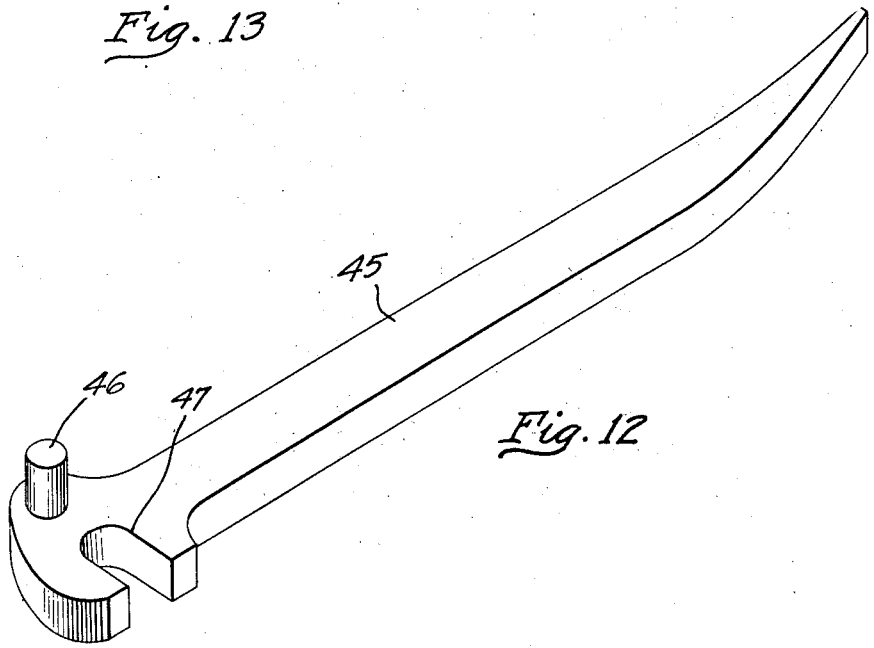
Fig. 12 is a perspective view of a tool by which the rims may be easily and quickly removed from the wheel.

In Fig. 12, I show a tool which may be employed for easily and quickly removing the rim from the wheel or placing it thereon. For the purpose of using the tool I secure to the rim at diametrically opposite points thereon a ball member 44 in a position spaced a predetermined amount from the adjacent bolts 29. The tool itself comprises a handle portion 45 having offset oppositely extending pins 46 secured therein and a recess 47 formed opposite the pins 46. In practice, when it is desired to remove a rim from the wheel, the bolts 29 are removed and one of the pins 46 is inserted in the opening in the foot 22 from which the bolt 29 adjacent the ball 44 has been removed, the ball 44 being received in the recess 47, as indicated in Fig. 13. Thereafter, upon swinging of the handle 45, the ball 44 and consequently the rim is forced axially of the wheel relative to the bolt hole and the rim is thereby forced off of the wheel. Obviously, by reversing the process, the tool may be employed as an aid in applying the rim to the wheel.

Formal changes may be made in the specific embodiment of the invention described without departing from the spirit or substance of the broad invention, the scope of which is commensurate with the appended claims.

What I claim is:

1. In combination, a wheel having a plurality of spokes each terminating at their outer ends in seats, each of said seats being disconnected from and spaced from the adjoining seats, the outer faces of said pads being formed to present generally cylindrically shaped rim receiving seats, a continuous tire rim received on said seats, and a pair of independent and circumferentially spaced radially acting means co-acting with each of said seats tending to draw said rim inwardly relative thereto.

2. In combination, a wheel having a plurality of circumferentially spaced and circumferentially extending generally cylindrical rim engaging seats, a continuous rim engaged on said seats, and means for securing said rim to said seats insuring an extended circumferential bearing area between each seat and said rim comprising circumferentially spaced bolts extending radially through each of said seats and threading into said rim and tending to draw said rim inwardly relative to said seats.

3. In combination, a wheel having a plurality of spokes detached from each other at their outer ends, the outer ends of said spokes being formed to provide generally cylindrically shaped rim receiving seats, a continuous tire rim having a marginally thickened integral portion provided with a cylindrical inner surface and a transversely extending elongated slot disposed between said thickened portion and the opposite side of said rim, said cylindrical surface seating directly upon said seats, and means tending to draw said surface inwardly relative to said seats comprising screws extending radially through said seats and threading into said thickened portion.

4. In combination, a wheel having not less than three and not more than six integral spokes, arcuate seats on the ends of said spokes disconnected from each other, a continuous tire rim and an integral continuous thickened portion on said rim forming a felloe for said wheel, the inner face of said thickened portion being cylindrical in formation and adapted to be received directly on said seats and radial fastening means extending through said seats and threading into said thickened portion for removably securing said rim and felloe to said spokes.

5. In combination, a wheel having not less than three spokes and not more than six spokes integral therewith, each of said spokes being provided with a generally cylindrical-shaped seat, a continuous tire rim provided with a marginal enlargement of greater width and thickness than the normal thickness of the metal of said rim and forming a felloe for said wheel, the inner face of said enlargement being received directly on the outer surface of said seats and means removably securing said felloe to said seats comprising radial fastening means extending through said seats and threading into said enlargement.

6. In combination, a wheel having not less than three spokes and not more than six spokes integral therewith, seats formed on the outer ends of said spokes, said seats being disconnected circumferentially of said wheel and each being provided with a generally cylindrical outer surface, a continuous rim member received directly on said seats, said rim member having a removable side flange ring, and means removably securing said rim member to said seats comprising radial fastening means extending through said seats and threading into said rim member.

7. In combination, a wheel having spokes terminating at their outer ends in arcuate seats, a removable continuous rim for said wheel, a felloe band for said wheel formed as an integral part of said rim and constituting an inwardly offset marginal enlargement thereof, and means for removably securing said rim and felloe band to said seats comprising screws extending approximately radially through said seats and threading into said felloe band.

8. In combination, a wheel having a plurality of integral spokes, each terminating at its outer end in a seat of limited circumferential dimensions, a continuous felloe band of limited width received on said seats and removably secured thereto by radial fastening means, clamping it on said seats, and a tire rim formed as an integral part of said felloe band projecting laterally therefrom in one direction.

9. In combination, a wheel having a plurality of integral spokes, a continuous felloe band removably secured to said spokes, a tire rim formed as an integral part of said felloe band projecting laterally therefrom, and means removably securing said felloe band to said spokes comprising screws extending radially through said seats and threading into said felloe band to clamp it to said seats.

10. In combination, a wheel having not less than three and not more than six integral spokes, an arcuate seat formed on the end of each of said spokes and extending circumferentially beyond the corresponding spoke, said seats being disconnected from each other circumferentially of said wheel, a continuous rim received directly on said seats, and an approximately radially extending bolt extending through each end of each of said seats and threading into said rim whereby to secure said rim to said seats and prevent separation of said rim and seats due to deformation of said rim when a load is applied to said rim between adjacent pairs of spokes.

EMIL A. NELSON.